US007782479B2

(12) United States Patent
Handa et al.

(10) Patent No.: US 7,782,479 B2
(45) Date of Patent: Aug. 24, 2010

(54) LABEL SHEET AND LABEL SHEET CREATING DEVICE

(75) Inventors: Yuji Handa, Tachikawa (JP); Katsuyoshi Suzuki, Akiruno (JP); Hirotaka Kuronuma, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 630 days.

(21) Appl. No.: 11/726,142

(22) Filed: Mar. 21, 2007

(65) Prior Publication Data

US 2007/0222205 A1 Sep. 27, 2007

(30) Foreign Application Priority Data

Mar. 24, 2006 (JP) ............................ 2006-083495

(51) Int. Cl.
*G06K 15/00* (2006.01)
*G06F 3/12* (2006.01)

(52) U.S. Cl. ...................................... 358/1.18; 358/1.1

(58) Field of Classification Search .................. 358/1.1, 358/1.9, 1.12, 1.18, 537, 538; 283/81
See application file for complete search history.

(56) References Cited

U.S. PATENT DOCUMENTS 5,227,209 A 7/1993 Garland
6,222,583 B1 * 4/2001 Matsumura et al. ......... 348/113
6,388,764 B2 * 5/2002 Petkovsek .................. 358/1.18
7,194,957 B1 * 3/2007 Leon et al. .................. 101/485
7,495,796 B2 * 2/2009 Keane et al. .............. 358/1.18
7,628,427 B2 * 12/2009 Adler et al. .................. 283/81

FOREIGN PATENT DOCUMENTS

JP 07-129087 A 5/1995
JP 2003-182159 A 7/2003

OTHER PUBLICATIONS

International Search and Written Opinion of the International Searching Authority for PCT/JP2007/056750, dated Jul. 31, 2007. 11 Sheets.

* cited by examiner

*Primary Examiner*—Gabriel I Garcia
(74) *Attorney, Agent, or Firm*—Frishauf, Holtz, Goodman & Chick, P.C.

(57) ABSTRACT

A label sheet is constituted by a second label and predetermined plural numbers of first labels which are formed consecutively with the second label. The first label to be attached to an object indicates predetermined information on the object, and the second label for managing the first label indicates second information which is not appropriate as the information to be indicated on the first label and is on the purpose and handling of the first label.

4 Claims, 9 Drawing Sheets

LABEL SHEET AND LABEL SHEET CREATING DEVICE

BACKGROUND OF THE INVENTION

1. Field of the Invention

The present invention relates to a label sheet provided with a first label which is to be attached to an object and a label sheet creating device which prints out the same.

2. Description of the Related Art

Disclosed in Unexamined Japanese Patent Application KOKAI Publication No. H7-129087 are a conventional label sheet having a merchandise label to be attached to a merchandise or the like and an index label for data checking, and the label sheet creating device thereof.

The label sheet comprises predetermined numbers of merchandise labels each to be attached to a merchandise or a package thereof, and an index label for data checking, the merchandise labels and the index label being consecutively provided. Data, such as characters and numbers is printed on the merchandise label. A bar code corresponding to the numeral data printed on the merchandise label is printed on the index label.

The label sheet is created by the following procedures. First, a product name code is entered through the input unit of the creating device. Print data on a merchandise corresponding to the product name code is read out from a memory. The print data and numeral data entered through the input unit are supplied to a label printer, thereby printing out a merchandise label. Bar code data corresponding the numeral data printed on the merchandise label is created, supplied to the label printer, thereby printing out an index label.

The conventional label sheet is constituted by combining the merchandise label which indicates information on a merchandise and the index label which indicates code information created by coding a first information on the merchandise label. Because the numeral data indicated by the merchandise label and the code information indicated by the index label correspond with each other, it is possible to check the numeral data indicated by the merchandise label by reading out the code information indicated by the index label.

The merchandise label has information which is not always appropriate if indicated on the merchandise label, or information which is inappropriate if indicated therein but necessary and convenient in managing the merchandise label.

According to the conventional label sheet, however, information indicated on the merchandise label and the index label correspond with each other. Therefore, there is an inconvenience such that information inappropriate if indicated is indicated on the merchandise label.

On the other hand, limiting information to be indicated on the merchandise label limits information to be indicated on the index label, resulting in inappropriate management of the merchandise label.

SUMMARY OF THE INVENTION

The present invention has been made to overcome the conventional problems, and it is an object of the present invention to provide a label sheet and a label sheet creating device thereof which enable appropriate management of a label to be attached to an object.

A label sheet of the present invention comprises:

a first label which indicates predetermined first information and is attached to an object; and a second label for managing the first label, and wherein the first label indicates first information which is information on the object, and the second label indicates second information which is information for managing the first label and is inappropriate when indicated on the first label.

The first information may comprise at least any one of character information, coded symbol image information and image information not including coded symbol image information, and the second information may comprise at least any one of character information, coded symbol image information, and image information not including coded symbol image information.

The information inappropriate when indicated on the first label may be information to be indicated only for a person who attaches the first label.

Management of the first label may mean appropriately attaching the first label to an attachment location in the object.

The information indicated on the second label may include information on a purpose of the first label.

The information indicated on the second label may include information on handling of the first label.

A language of the first information and a language of the second information may differ from each other.

A plurality of first labels may be consecutively provided, and at least one second label may be consecutively provided at an end portion of the plurality of first labels.

A label sheet creating device according to the present invention that forms a label sheet, which has a first label to be attached to an object and a second label for managing the first label, on a medium on which printing is performed, comprises:

a printing unit that prints information on the print medium;

a first information memory unit that stores first information which is indicated on the first label and is on the object;

a second information memory unit that stores second information which is indicated on the second label, is for managing the first label, and is inappropriate when indicated on the first label;

a print data creating unit which creates pieces of print pattern data for the first information stored in the first information memory unit and the second information stored in the second information memory unit; and a print controller unit which supplies the pieces of print pattern data created by the print data creating unit to the printing unit, causes the first and second information to be printed on the print medium to create the label sheet having the first label and the second label.

The print data creating unit may have a coded image data creating unit which creates information of either one of the first information and the second information by print pattern data on a coded symbol image, and the print controller unit may print a coded symbol image based on print pattern data created by the print data creating unit.

The label sheet creating device may further comprise a print number specifying unit which specifies a number of first labels to be printed, wherein the print controller unit repeats printing of the first label by the number of first labels to be printed which is specified by the print number specifying unit.

The label sheet creating device may further comprise a half cut unit that performs half cut of cutting only the print tape layer of the tape-type print medium, and wherein the print medium employs a stacked layer structure of a tape-type print medium having a print tape layer on which printing is performed, an adhesive layer and a strippable tape layer, and the print controller unit causes the half cut unit to perform half cut on a boundary between the first label and the second label.

The label sheet of the present invention comprises the first label which is to be attached to an object and indicates predetermined first information, and the second label that indicates second information which is for managing the first label and is inappropriate as the first information indicated on the first label. Therefore, it is possible to provide the label sheet which enables appropriate management of the first label.

Moreover, the label sheet creating device of the present invention prints out the first label which is attached to an object and indicates a predetermined information, and prints out the second label that indicates second information whose contents is inappropriate as the first information indicated on the first label, thereby creating the label sheet. Therefore, the label sheet creating device of the present invention can create the label sheet which enables appropriate management of the first label.

BRIEF DESCRIPTION OF DRAWINGS

These objects and other objects and advantages of the present invention will become more apparent upon reading of the following detailed description and the accompanying drawings in which.

DETAILED DESCRIPTION OF THE PREFERRED EMBODIMENT

Embodiments of the present invention will be explained with reference to the accompanying drawings. FIGS. 1 to 5 show label sheets according to the embodiments of the present invention. Each label sheet LS comprises a second label Lb which indicates second information and first labels La which indicate first information. The first label La indicates first information on an object like a merchandise, and is attached to the object. The second label Lb indicates second information which is information for managing the first label La, and the second information is used for managing the first label La. Managing the first label La means enabling appropriate attachment of the first label to the attachment location in the object. For example, seeing second information which describes the purpose of the first label makes it possible to appropriately attach the first label to the object. Seeing second information which describes the attachment location of the first label with respect to the object makes it possible to appropriately attach the first label to the object. Further, seeing second information which describes a person who is responsible for attaching the first label makes it possible to appropriately attach the first label to the object. Still further, seeing second information which describes the contents of the first label makes it possible to appropriately attach the first label to the object. Yet further, seeing second information which is described in a different language from the language representing the contents of the first label makes it possible to appropriately attach the first label to the object.

As shown in FIGS. 1 to 5, a label sheet LS comprises a piece of second label Lb and predetermined numbers of first labels La which are connected to the second label Lb consecutively. A tape-type medium subject to printing is used as a sheet material which forms the label sheet LS. The tape-type print medium comprises a print tape layer having a rear face starched and a front face on which a label is printed, and a strippable tape layer which is stacked on the starched rear face of the print tape layer. Each label region is set along the lengthwise direction of the print tape layer of the tape-type print medium. A piece of second label Lb and predetermined pieces of first labels La are formed in the respective label regions by cutting and partitioning the print tape layer along half cut lines HC while remaining the strippable tape layer uncut.

Figure 4:
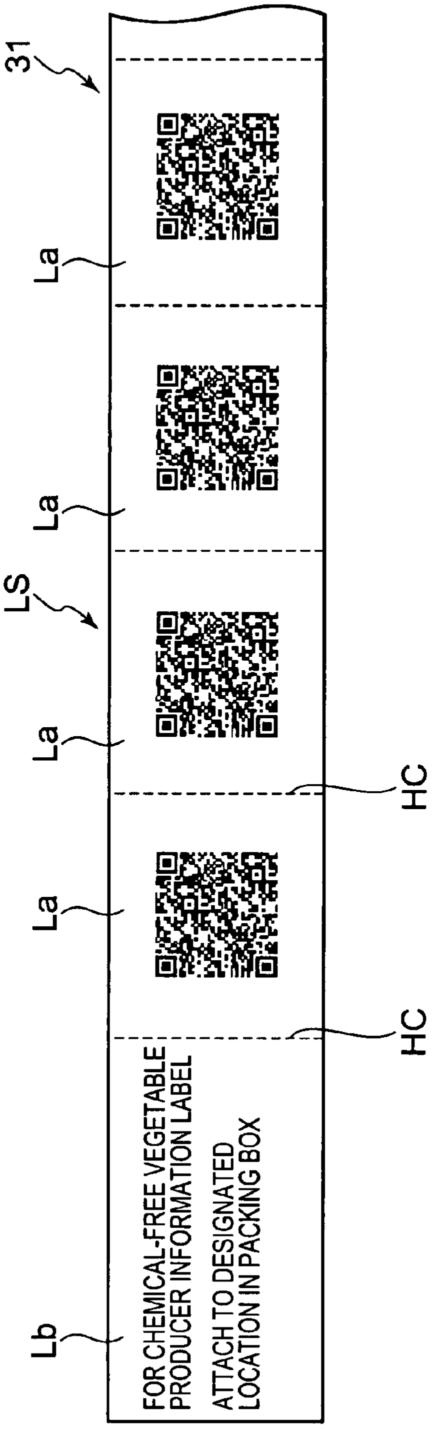
FIG. 4 is a diagram for explaining one of the other label sheets according to the embodiment of the present invention.
Figure 5:
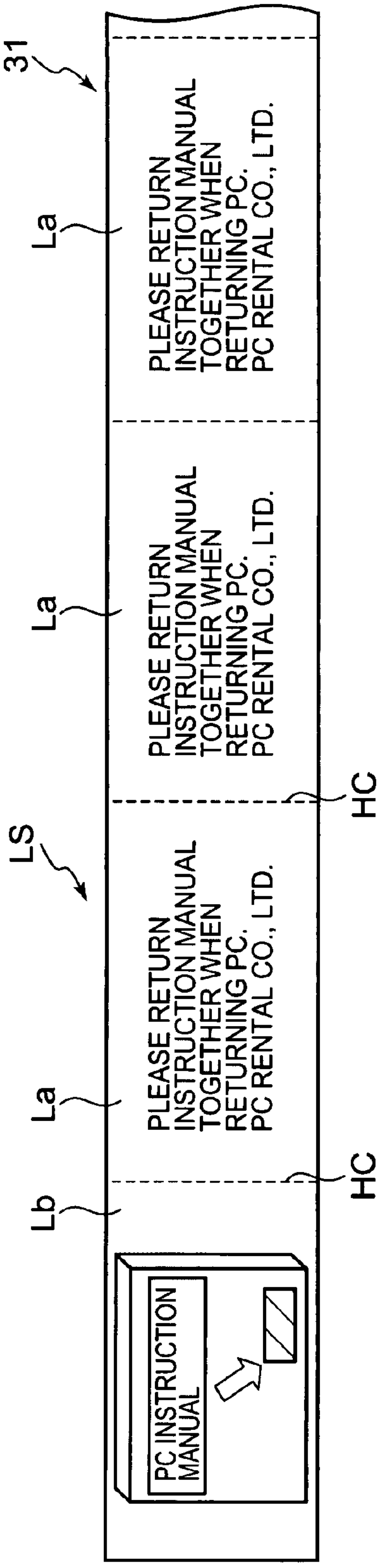
FIG. 5 is a diagram for explaining one of the other label sheets according to the embodiment of the present invention.

The label sheet employs plural kinds of indication styles. For example, as shown in FIGS. 1A to 1C and 3, a second label Lb and first label La may indicate characters, respectively. As shown in FIGS. 2A to 2C, a second label Lb may indicate a two dimensional code (QR code), while a first label La may indicate characters. As shown in FIG. 4, a second label Lb may indicate characters, while a first label La may indicate a QR code. As shown in FIG. 5, a second label Lb may indicate a picture image, while a first label La may indicate characters.

Figure 1A:
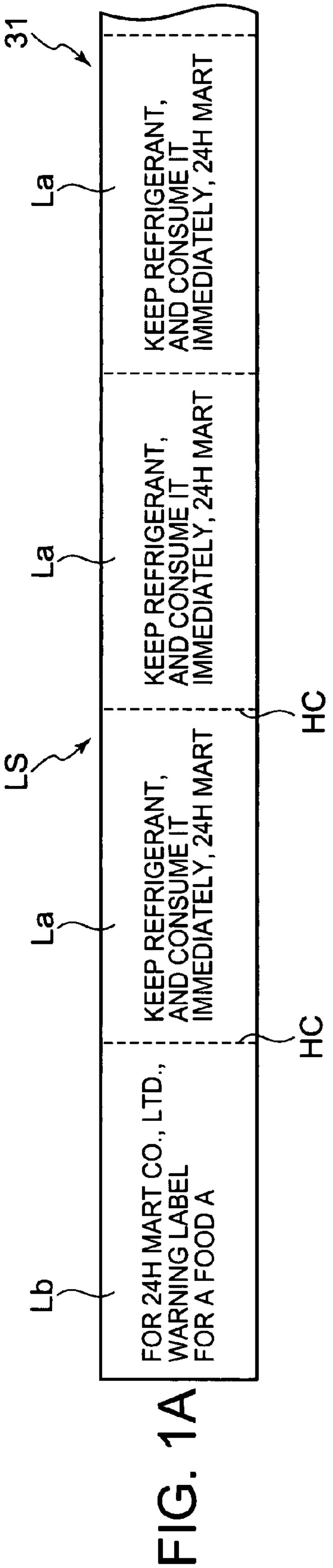
FIG. 1A is a diagram for explaining a label sheet according to an embodiment of the present invention.
Figure 2A:
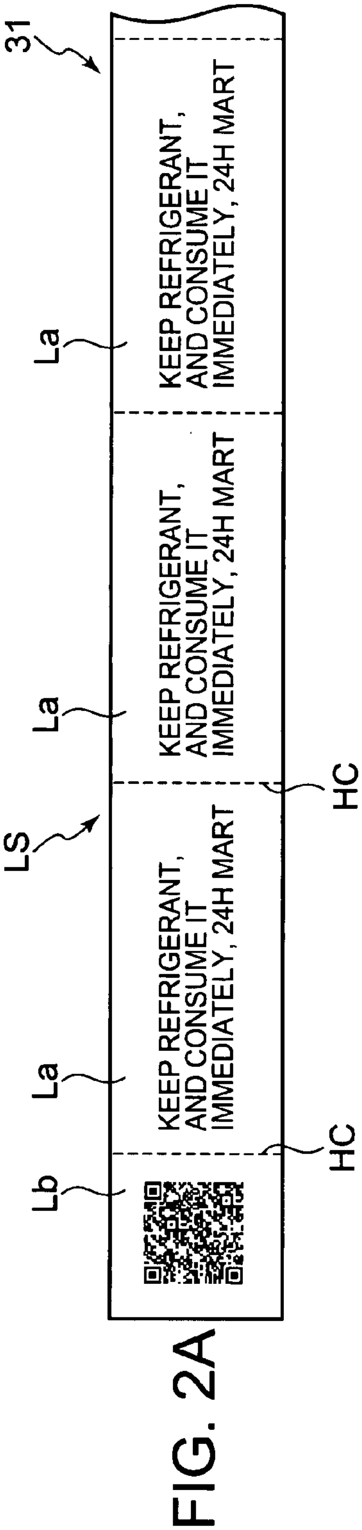
FIG. 2A is a diagram for explaining another label sheet according to the embodiment of the present invention.
Figure 2B:
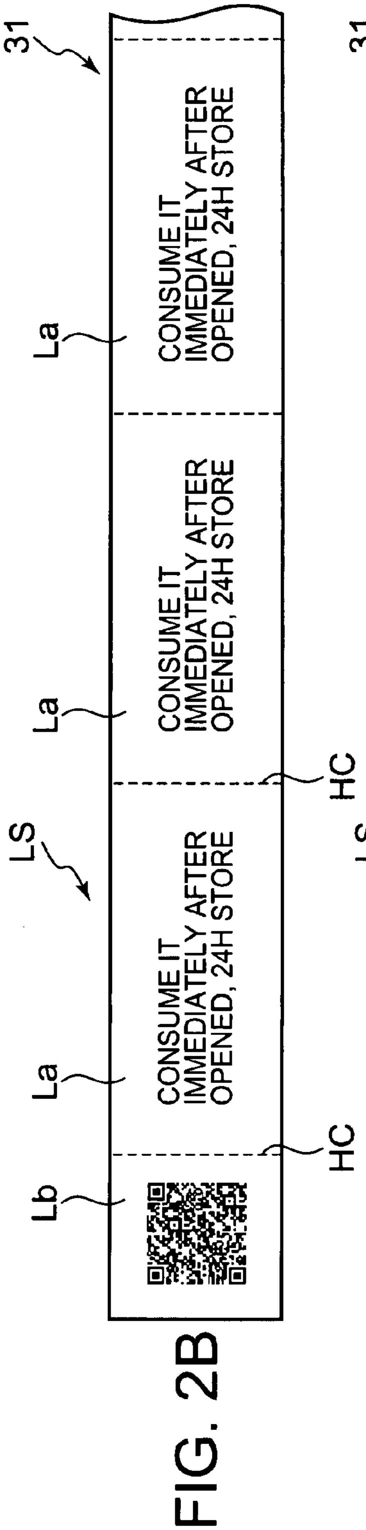
FIG. 2B is a diagram for explaining another label sheet according to the embodiment of the present invention.
Figure 2C:
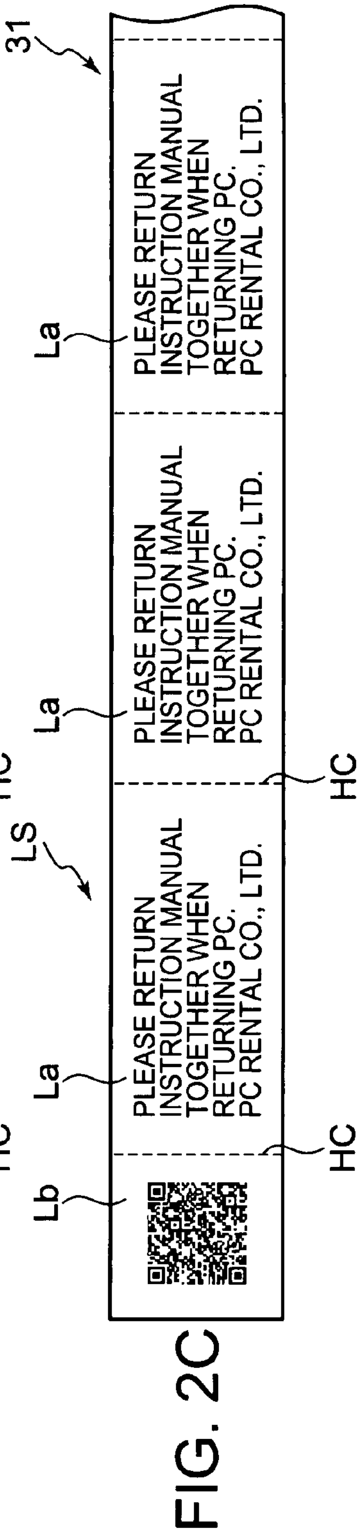
FIG. 2C is a diagram for explaining another label sheet according to the embodiment of the present invention.

For example, according to the label sheet LS shown in FIG. 1A, characters "For 24 h Mart Co., Ltd., Warning Label for a food A" are printed on a second label Lb, and "Keep refrigerant and consume it immediately, 24 h Mart" are printed on a first label La.

Figure 1B:
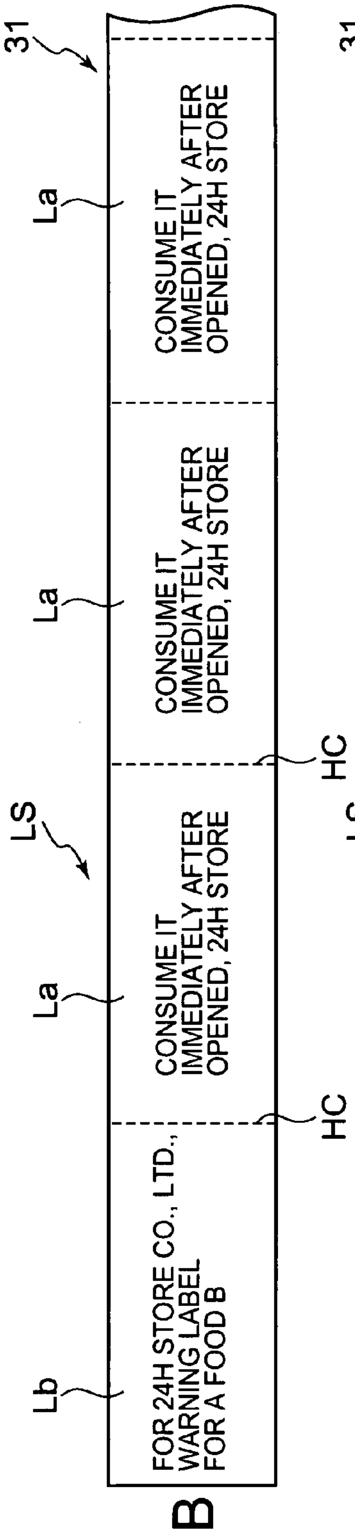
FIG. 1B is a diagram for explaining the label sheet according to the embodiment of the present invention.

According to a label sheet LS shown in FIG. 1B, characters "For 24 h Store Co., Ltd., Warning Label for a food B" are printed on a second label Lb, while characters "Consume it immediately after opened, 24 h store" are printed on a first label La.

Figure 1C:
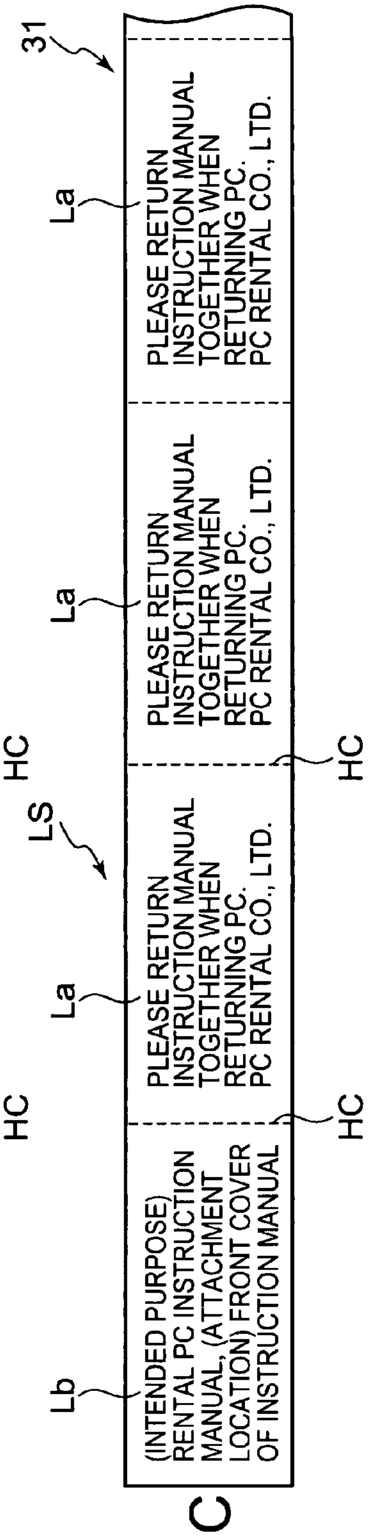
FIG. 1C is a diagram for explaining the label sheet according to the embodiment of the present invention.

According to a label sheet LS shown in FIG. 1C, characters "(Intended Purpose) Rental PC instruction manual, (Attachment location) Front cover of instruction manual" are printed on a second label Lb, while characters "Please return instruction manual together when returning PC. PC Rental Co., Ltd.," are printed on a first label La.

In this manner, the first label La indicates information on an object subject to label attachment, and the second label Lb indicates contents on the purpose and handling of the first label La. That is, the first label La of the label sheet LS shown in FIG. 1A is to be attached to a merchandise of 24 h Mart Co., Ltd., and the first label La of the label sheet LS shown in FIG. 1B is to be attached to a merchandise of 24 h Store Co., Ltd. The second labels Lb of the respective label sheets LS indicate information which are for management of the first label La. This information represent that the first label La is used for a particular merchandise of a particular customer.

The first label La of the label sheet LS shown in FIG. 1C indicates a predetermined cautionary statement regarding a rental PC, while the second label Lb indicates the contents which specify an object to which the first label La is attached or an attachment location therein. Such second information indicated by the second label Lb are inappropriate contents as contents indicated by the first label La, and cannot be indicated on the first label La. Accordingly, the second label Lb that indicates second information which cannot be indicated on the first label La but necessary for management of the first label La is separately provided in the label sheet LS from the first label La. This facilitates management of the first label La while referring to the second label Lb without a mistake.

According to another embodiment, a label sheet LS of the present invention can be used for a tissue paper distributed for the purpose of advertisement to obtain a new client for a bank. In this case, an advertisement statement like "The interest of a loan from XX bank is XX % during a campaign period" can be indicated on the first label La. On the other hand, the distribution norm and distribution location of the distribution tissue papers, and the desired number of the distribution tissue papers to be distributed, like "Advertisement distribution tissue paper, distribute XX numbers of tissue papers at XX place" are indicated on the second label Lb. As mentioned, regarding the advertisement tissue paper, there are an advertisement indicated for a client, and an explanation for a person who distribute the tissue paper, the advertisement can be indicated on the first label La, while the explanation for the distributing person can be indicated on the second label Lb.

According to one of the other embodiments, a label sheet LS of the present invention can be used for the package of a cosmetic item for females. In this case, the promotional statement of the cosmetic item like "High quality moisturizing cream. 80% amino collagen contained" can be indicated on the first label La. In contrast, the target age group of the cosmetic item, the symptom of a female which needs the cosmetic item, the type of a female, etc., like "This is recommended for a female from 30's to 50's who looses skin vitality" can be indicated on the second label Lb. As described above, the cosmetic item for females has an advertisement indicated for a customer, and an explanation indicated for a sales person, the advertisement for the customer is indicated on the first label La, while the explanation for the sales person is indicated on the second label Lb. Accordingly, by using the label sheet LS of the present embodiment, it becomes possible to sale a cosmetic item to a customer appropriately while paying attention as not to give a rude explanation to a female who is about to purchase the cosmetic item.

Further, the label sheet LS of the present embodiment can be used for used game softs. In this case, a promotional statement like "Tough and full-scale history simulation. Spectacular ancient romance is now brought back to you " can be indicated on the first label La. In contrast, the category of the game soft, the target age group, the player group, etc., like "Simulation game. For experts. Total play time 50 hours. Challenge level high" can be indicated on the second label Lb. There are an advertisement for a customer and an explanation for a sales person regarding used game softs in this manner, the advertisement for the customer is indicated on the first label La, while the explanation for the sales person is indicated on the second label Lb. Used game softs become diverse and complex to satisfy the experts' demand, so that management thereof becomes difficult for a sales person who does not have a sufficient knowledge about the game softs. By using the label sheet LS of the present embodiment, however, it becomes possible to sale game softs appropriately while giving an advertisement to a person who is about to purchase the game softs even if a sales person does not have a sufficient knowledge about the game softs.

The label sheets LS shown in FIGS. 2A, 2B, and 2C, respectively, have a QR code indicated on the second label Lb, the character information indicated on each second label Lb in FIG. 1 is coded to the QR code, and the symbol image thereof is indicated. Coding the character information to a QR code makes it possible to efficiently put more pieces of second information in the small label region of the second label Lb.

Figure 3:
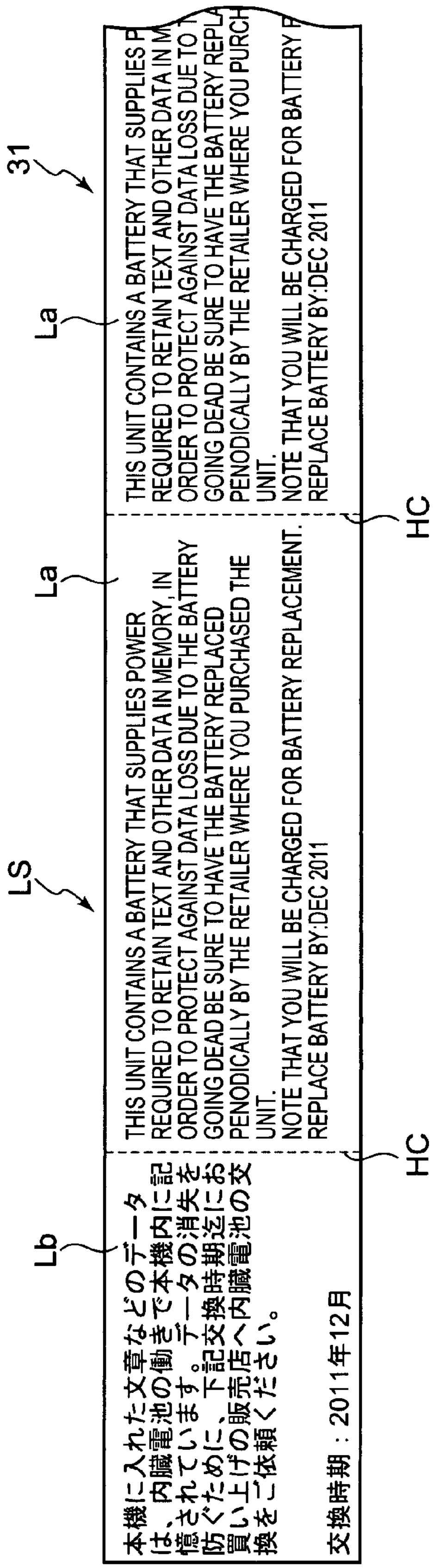
FIG. 3 is a diagram for explaining one of the other label sheets according to the embodiment of the present invention.

FIG. 3 shows a label sheet LS which is a notice label attached to an electronic device for overseas and notifies the replacement date of an internal battery. The language of first information in the first label La and that of second information in the second label Lb differ from each other. That is, the first label La describes the first information in English, while the second label Lb describes the second information in Japanese. Even if a person who handles the label sheet LS does not understand the contents written in English, handling and management of the first label La is surely facilitated by providing the second label Lb which has a notation written in a language understandable for that person. The label sheet LS having character information indicated on the second label Lb and character information indicated on the first label La expressed in different languages can be created in this manner.

A label sheet LS shown in FIG. 4 is constituted by combining a first label La indicating a QR code to be attached to a chemical-free vegetable and a second label Lb thereof. In the first label La, plural pieces of information regarding the chemical-free vegetable, such as the name of a producer, the production area, and the food preparation method are coded. The coded information can be read out through a cellular phone or the like.

The contents of such a QR code in the first label La cannot be visually checked. However, providing the second label Lb which indicates plural pieces of information, such as the title of the first label, the purpose and attachment location thereof by characters facilitates a person who is supposed to handle the label sheet LS to handle the first label La without a mistake.

A label sheet LS shown in FIG. 5 is used for rental PCs. A second label Lb indicates information on an object to which a first label La is attached and an attachment location by a picture image. Because information on handling and management of the first label La is expressed by the picture image, it is possible to visually and easily give the information to a person who handles the label sheet LS.

According to the label sheet LS of the present embodiments, it is possible to appropriately manage the first label La to be attached to an object by providing the second label Lb which holds predetermined information for managing the first label La.

Next, an explanation will be given of a label sheet creating device which creates the label sheet LS.

Figure 6:
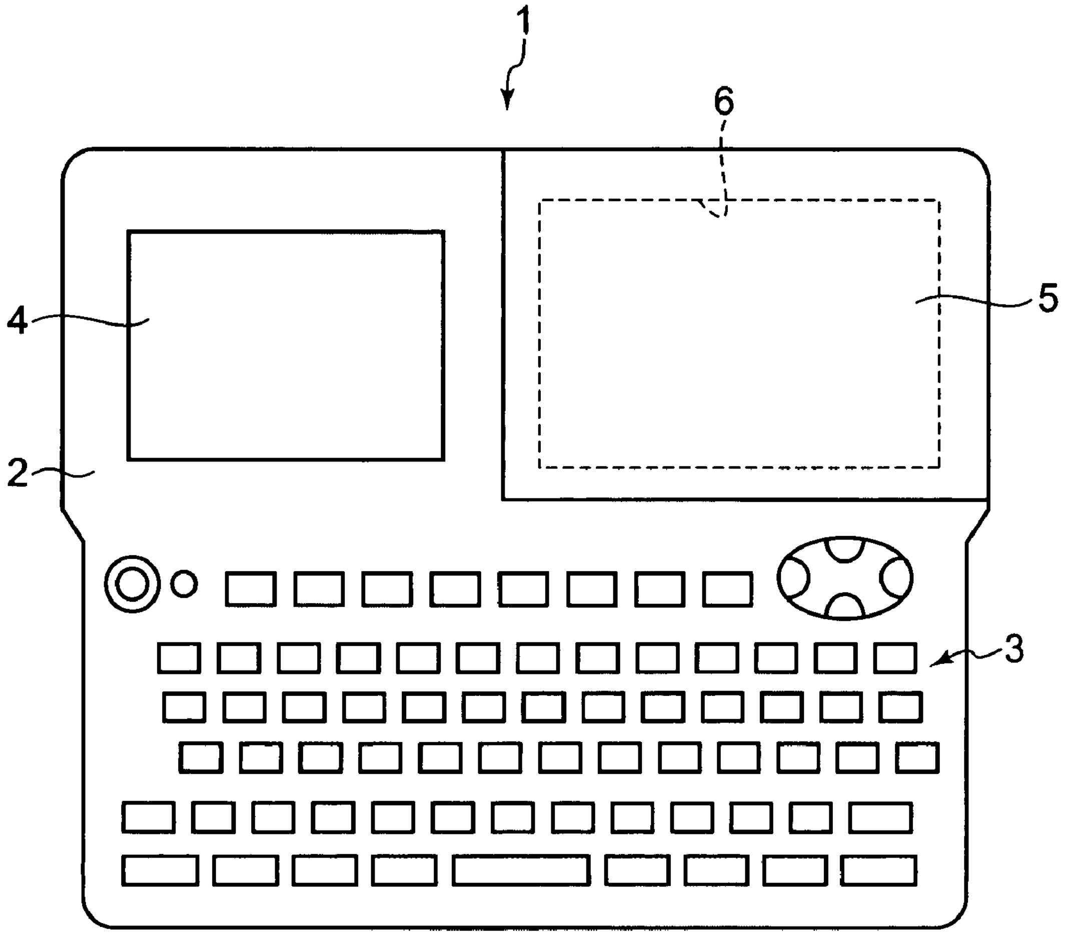
FIG. 6 is a top plan view showing a label sheet creating device according to the embodiment of the present invention.
Figure 7:
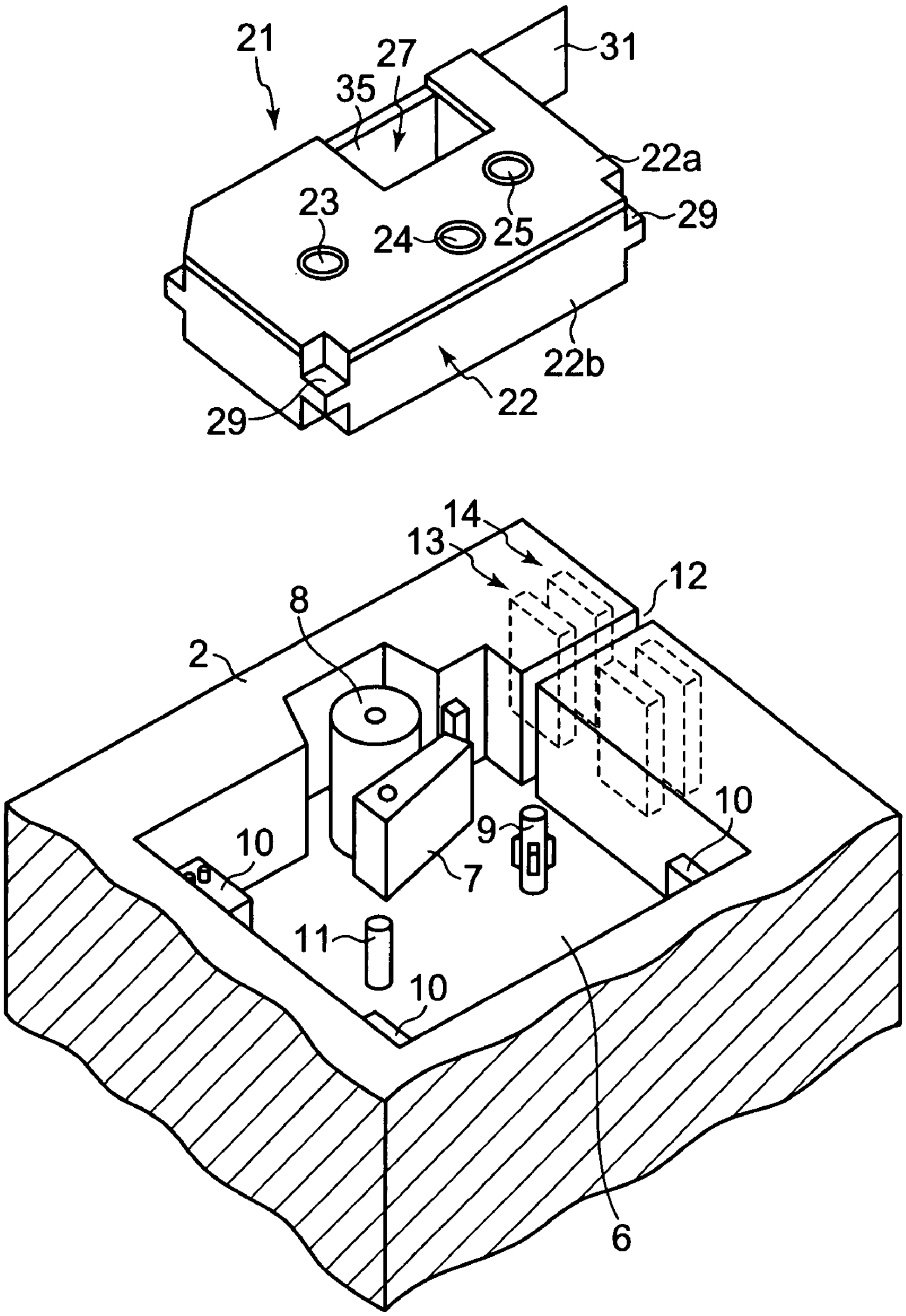
FIG. 7 is a perspective view showing the major part of the label sheet creating device according to the embodiment of the present invention and a tape cassette.

FIG. 6 is a top plan view showing the label sheet creating device according to an embodiment of the present invention which creates the label sheet LS. FIG. 7 is a perspective view showing the contour of a tape cassette used by the label sheet creating device and a part of the internal structure of the label sheet creating device.

As shown in FIGS. 6 and 7, a label sheet creating device 1 has a key input unit 3, a display unit 4, and an opening/closing lid 5 at the top face of a device main body 2. A cassette loading portion 6 for loading a tape cassette 21 which contains a print tape 31 and an ink ribbon 35 is formed inside the opening/closing lid 5. The tape cassette 21 is detachably loaded in the cassette loading portion 6 with the opening/closing lid 5 opened.

The key input unit 3 has character keys for entering data on a character string to be printed, a print key for instructing the start of printing, cursor keys for moving a cursor on a display screen of the display unit 4, and various control keys necessary for a process of editing an entered character string, various setting processes, a printing process, and the like.

The display unit 4 comprises a liquid crystal display device, and displays entered data, a selection menu screen for various settings, and a message on a process. Various information, such as the length of a label to be created, and the state of a printing mode are also displayed.

Provided inside the cassette loading portion 6 are a thermal head 7 which has printing elements arranged in a lengthwise direction and performs printing on the print tape 31, a platen roller 8 which sandwiches the print tape 31 and the ink ribbon 35 with the thermal head 7 and conveys those, and a ribbon rewind shaft 9 which rewinds the used pieces of the ink ribbon 35 into the tape cassette 21. Further, cassette reception units 10 which support the tape cassette 21 at a predetermined position, and an engagement shaft 11 which is engaged with the tape cassette 21 for positioning are provided.

An ejection port 12 which communicates with the exterior of the device main body 12 is formed at one end portion of the cassette loading portion 6. A half cutter 13 is provided at the ejection port 12. The half cutter 13 is driven by a motor and cuts a print tape layer while leaving a strippable tape layer of the print tape 31 uncut, thereby applying half cuts HC between the second label Lb and the first label La, and between two adjoining first labels La. Moreover, the ejection port 12 is provided with a full cutter 14. The full cutter 14 is driven by the motor, and cuts off the label sheet LS having the second label Lb and the first label La from the print tape 31.

The tape cassette 21 has a cassette case 22 constituted by combining a top case 22*a* and a bottom case 22*b*. Housed in the cassette case 22 are a tape core 23 which winds up the print tape 31, a ribbon supply core 24 which winds up pieces of the ink ribbon 35 not in use yet, and a ribbon rewinding core 25 which rewinds pieces of the ink ribbon 35 already used for printing.

The print tape 31 employs a stacked layer structure of a print tape layer on which printing is performed, an adhesive layer, and a strippable tape layer. The cassette case 22 of the tape cassette 21 has a head disposing portion 27 formed in such a way that the thermal head 7 is disposed thereat when the tape cassette 21 is loaded in the cassette loading portion 6. Engagement portions 29 which are engaged with the cassette reception units 10 of the cassette loading portion 6 and supported by those units are formed at corners of the cassette case 22.

When the tape cassette 21 is loaded in the cassette loading portion 6 and start of printing is instructed, the print tape 31 and the ink ribbon 35 are drawn from the tape cassette 21, sandwiched between the platen roller 8 and the thermal head 7 and conveyed with the print tape 31 and the ink ribbon 35 being overlapped. The thermal head 7 is heated and driven based on print data entered through the key input unit 3, and the ink of the ink ribbon 35 is thermally transferred on the print tape 31, thereby performing printing.

Figure 8:
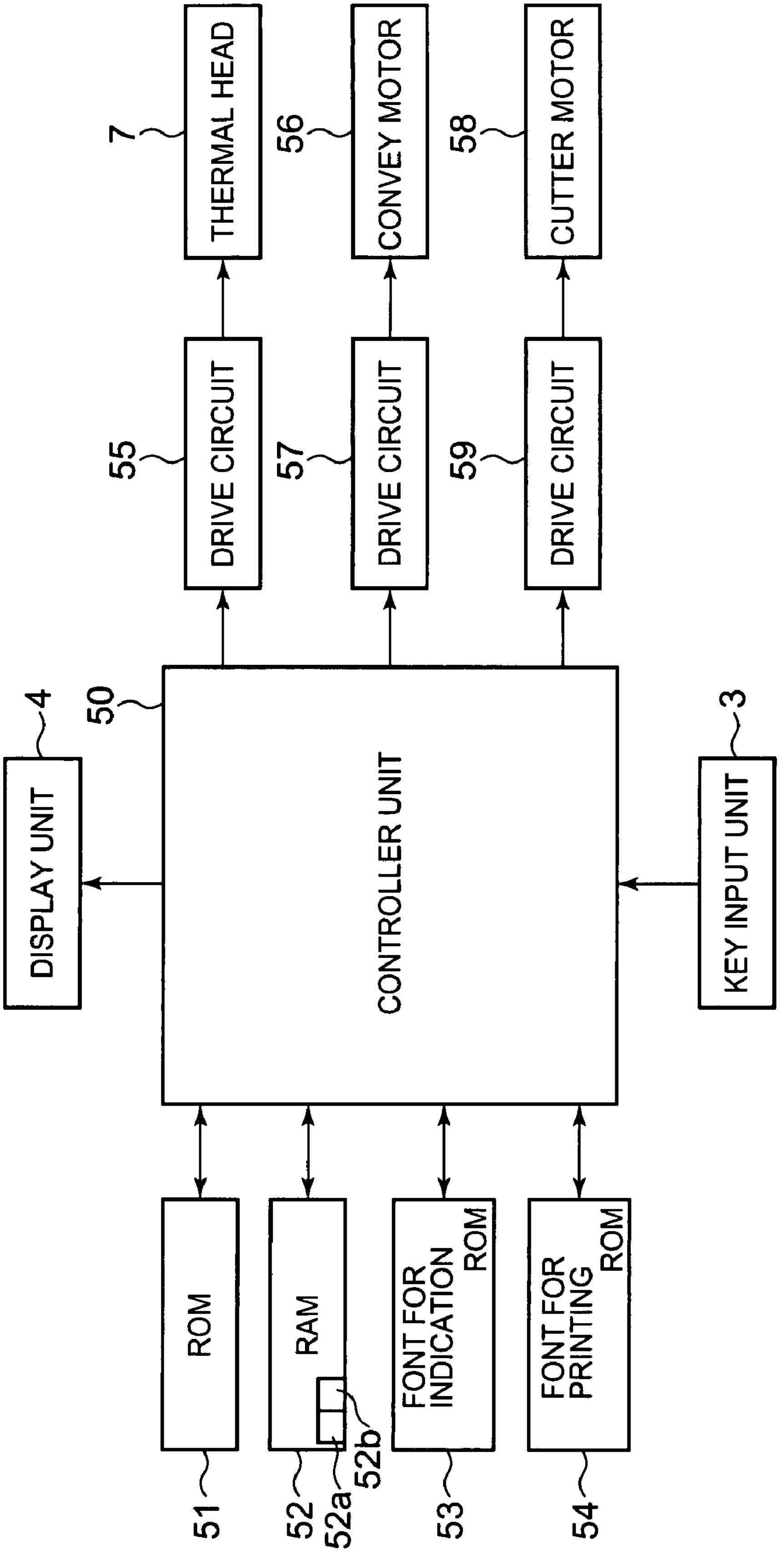
FIG. 8 is a block diagram showing the electronic circuit of the label sheet creating device according to the embodiment of the present invention.

FIG. 8 is a block diagram showing the structure of the electronic circuit of the label sheet creating device. As shown in the figure, the electronic circuit of the label sheet creating device has a controller unit 50 which comprises a CPU. The controller unit 50 runs a system program stored in a ROM 51 beforehand in accordance with a key operation signal from the key input unit 3, uses a RAM 52 as a work memory, and controls the operation of each unit of the circuit. Connected to the controller unit 50 are a display font ROM 53 for storing data on character fonts for display, a printing font ROM 54 for storing data on character fonts for printing, a drive circuit 55 for heating and driving the thermal head 7 in accordance with print data, a drive circuit 57 for a convey motor 56 comprising a step motor which drives the platen roller 8 and the ribbon rewind shaft 9, a drive circuit 59 for a cutter motor 58 which drives the half cutter 13 and the full cutter 14, and the display unit 4 for displaying entered character data, in addition to the key input unit 3, the ROM 51, and the RAM 52.

The ROM 51 stores a program which converts information entered through the key input unit 2 into pattern information of a two-dimensional code, a program for printing the two-dimensional code and pattern information on character information, and a program for controlling the operation of the label sheet creating device 1.

A memory area like a first information memory area and a second information memory area which stores character information entered through key manipulations, and to be printed on the second label Lb and the first label La is formed in the RAM 52. Further, a print information memory area which develops and stores input character information and pattern information on a created two-dimensional code, and a first information memory area which stores pattern information to be displayed on the display unit 4 are formed in the RAM 52. The RAM 52 has a register which temporarily stores information necessary for a printing process and a counter. Note that it is not illustrated in the figure, but the RAM 52 is connectable to an external memory device which stores picture images to capture picture images.

Figure 9:
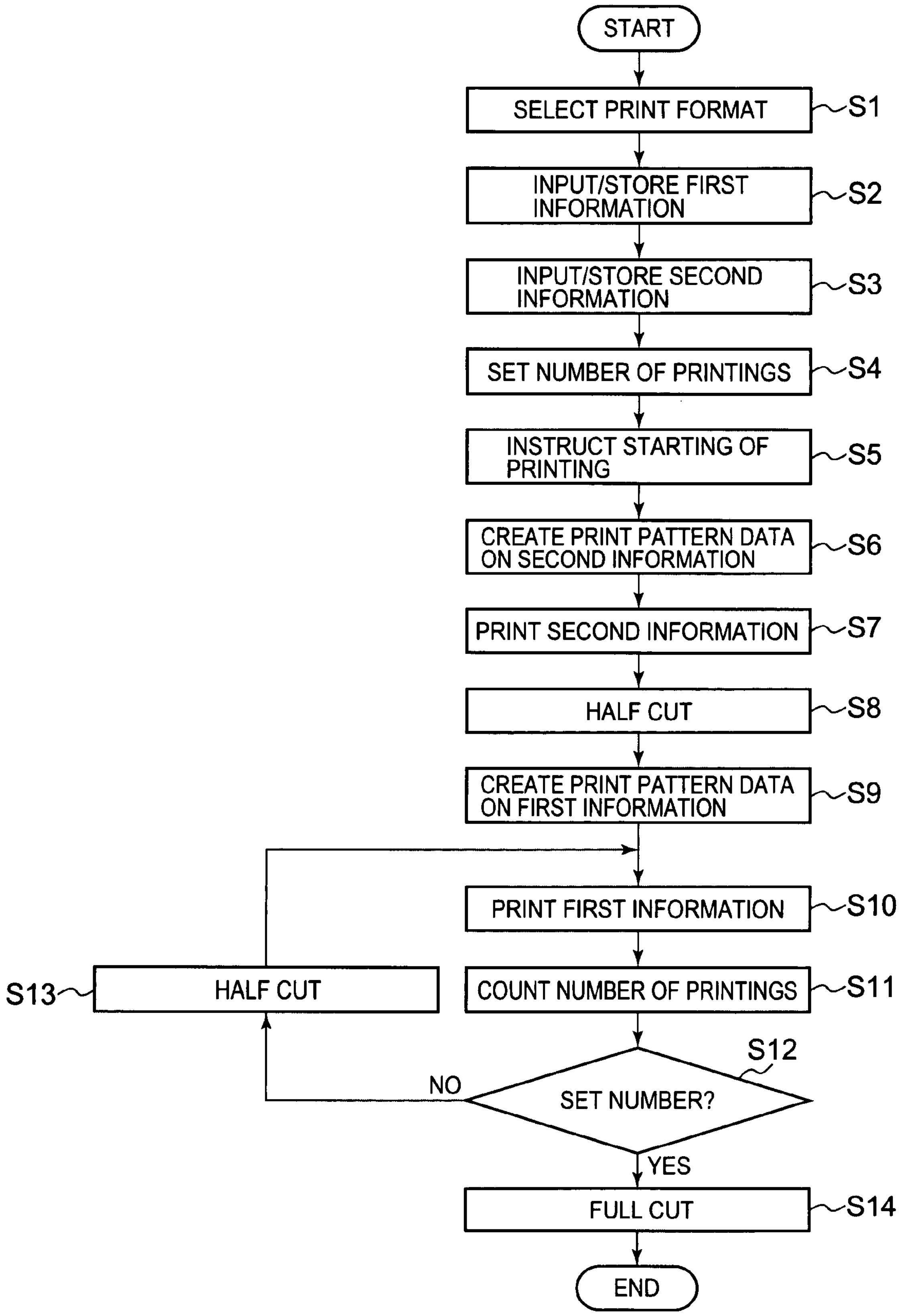
FIG. 9 is a flowchart showing a printing process performed by the label sheet creating device according to the embodiment of the present invention.
Figure 10A:
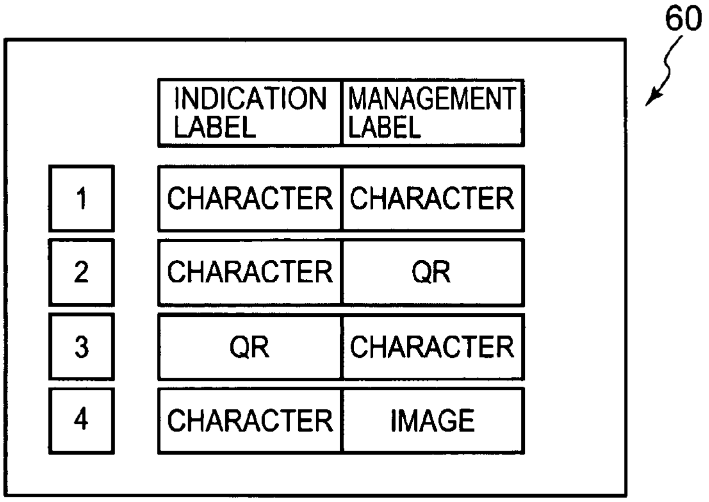
FIG. 10A is a diagram for explaining a display screen of the label sheet creating device according to the embodiment of the present invention in the printing process.

Hereinafter, an explanation will be given of a printing process of creating the label sheet of the present embodiments with reference to the flowchart in FIG. 9. When the printing process is started, selection of a print format for the label sheet LS is carried out through a selection screen 60 shown in FIG. 10A. In the selection of the print format, a combination of kinds of information to be indicated on the second label Lb and the first label La is selected. As shown in FIG. 10A, the combination of information for the second label Lb and the first label La is selected from any one of a case where characters and characters are combined, a case where the symbol image of a QR code is combined with characters, a case where characters are combined with the symbol image of a QR code, and a case where characters and an image are combined (step S1).

Figure 10B:
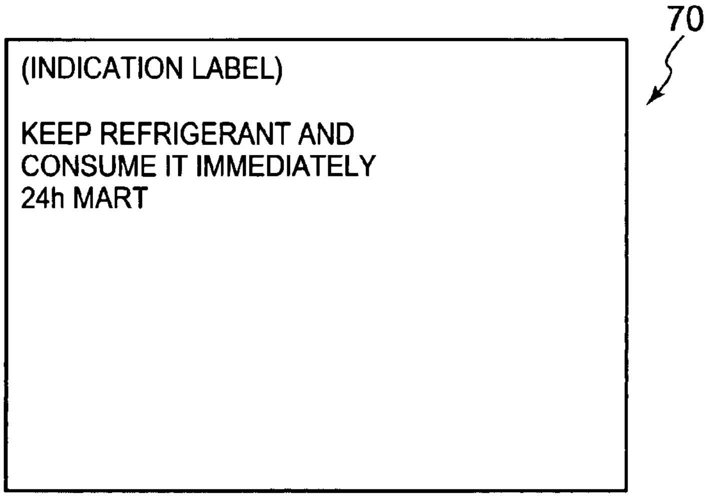
FIG. 10B is a diagram for explaining a display screen of the label sheet creating device according to the embodiment of the present invention in the printing process.

When the print format has been selected, first information according to the selected print format and to be printed on the first label La, such as character information, character information converted into the symbol image of a QR code, or image information are entered by an operator through an input editing screen 70 shown in FIG. 10B, and is stored in the first memory area in the RAM 52 (step S2).

Figure 10C:
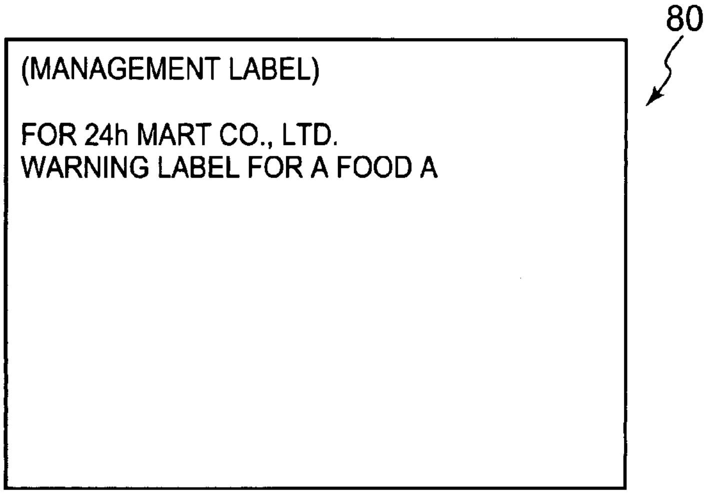
FIG. 10C is a diagram for explaining a display screen of the label sheet creating device according to the embodiment of the present invention in the printing process.

As second information to be indicated on the second label Lb, information whose contents are not appropriate as first information to be indicated on the first label La is entered through an input editing screen 80 shown in FIG. 10C by an operator. The second information is entered as character information, character information to be converted into the symbol image of a QR code, and the like, and stored in the second information memory area in the RAM 52 (step S3).

Further, the number of the first labels La to be printed is entered by the operator, data on that number is set in the RAM 52 (step S4).

When the operator instructs starting of printing (step S5), print information on the second information stored in the second information memory area in the RAM 52 is created. When information to be printed as the second information is characters, the print pattern information on entered character information is developed in the RAM 52, when information to be printed as the second information is the symbol image of a QR code, entered character information for conversion into a QR code is converted into pattern information on the symbol image of the QR code, and when the second information is picture image information, print information on the picture image is created (step S6).

The created print information is transferred to the thermal head 7, the thermal head 7 is driven based on that print information, the second information is printed on the print tape 31 which is conveyed by the platen roller 8, thereby creating the second label Lb (step S7).

When creation of the second label Lb is completed, the half cutter 13 is driven, and a half cut HC is applied to the print tape 31 at the end portion of the print region in the second label Lb (step S8).

Next, print information to be indicated on the first label La is created based on the first information stored in the first information memory area in the RAM 52 (step S9). The thermal head 7 is driven based on that print information, the first information is printed on a tape region next to that region where the second label Lb is created, thereby creating the first label La (step S10).

When printing of the first label La is completed, the number of printed first labels La is counted (step S11). Thereafter, it is determined whether or not the count value of that number matches with the set number of printings (step S12). When it does not reach the set number of printings, the half cutter 13 is driven, and a half cut HC is applied to the print tape 31 at the end portion of the printed first label La (step S13), the process returns to the step S10, and a next first label La is printed. Printing of the first label La is repeated until the number of the first labels La to be printed reaches the set printing number. When the number of the printed first labels La becomes the set printing number, the full cutter 14 is driven, and a tape cut process of cutting off the label sheet LS having the second label Lb and the first labels La from the print tape 31 is performed (step S14). As a result, the label sheet LS shown in any one of FIGS. 1 to 5 is created.

According to the label sheet creating device 1 of the present embodiment, the label sheet LS is created by printing the first label La which is to be attached to an object and indicates predetermined information, while printing the second label Lb which indicates second information whose contents is not appropriate as first information to be indicated on the first label La, and this makes it possible to create the label sheet LS which enables appropriate management of the first label La.

Various embodiments and changes may be made thereunto without departing from the broad spirit and scope of the present invention. The above-described embodiments are intended to illustrate the present invention, not to limit the scope of the present invention. The scope of the present invention is shown by the attached claims rather than the embodiments. Various modifications made within the meaning of an equivalent of the claims of the present invention and within the claims are to be regarded to be in the scope of the present invention.

This application is based on Japanese Patent Application No. 2006-83495 filed on Mar. 24, 2006 and including specification, claims, drawings and summary. The disclosure of the above Japanese Patent Application is incorporated herein by reference in its entirety.

What is claimed is:

1. A label sheet creating device that forms a label sheet, which has a first label to be attached to an object and a second label for managing the first label, on a print medium on which printing is performed, comprising:

a printing unit that prints information on the print medium;

a first information memory unit that stores first information which is to be indicated on the first label and is on the object;

a second information memory unit that stores second information which is to be indicated on the second label, is for managing the first label, and is inappropriate for indication on the first label;

a print data creating unit which creates pieces of print pattern data for the first information stored in the first information memory unit and the second information stored in the second information memory unit; and a print controller unit which supplies the pieces of print pattern data created by the print data creating unit to the printing unit, and causes the first and second information to be printed on the print medium to create the label sheet having the first label and the second label.

2. The label sheet creating device according to claim 1, wherein the print data creating unit includes a coded image data creating unit which creates print pattern data on a coded symbol image corresponding to one of the first information and the second information; and wherein the print controller unit prints the coded symbol image based on the print pattern data created by the print data creating unit.

3. The label sheet creating device according to claim 1, further comprising a print number specifying unit which specifies a number of first labels to be printed;

wherein the print controller unit repeats printing of the first label to print the number of first labels to be printed specified by the print number specifying unit.

4. The label sheet creating device according to claim 1, wherein the print medium comprises a tape-type print medium having a stacked layer structure including a print tape layer on which printing is performed, an adhesive layer, and a strippable tape layer;

wherein the label sheet creating device further comprises a half cut unit that performs a half cut of cutting only the print tape layer of the tape-type print medium; and wherein the print controller unit causes the half cut unit to perform the half cut on a boundary between the first label and the second label.

* * * * *